United States Patent [19]

Yurgelites

[11] Patent Number: 5,500,895
[45] Date of Patent: Mar. 19, 1996

[54] TELEPHONE ISOLATION DEVICE

[76] Inventor: Gerald J. Yurgelites, 2133 Asilomar Dr., Antioch, Calif. 94509

[21] Appl. No.: 248,226
[22] Filed: May 24, 1994
[51] Int. Cl.⁶ .................................................. H04M 1/76
[52] U.S. Cl. ...................... 379/412; 379/405; 379/413; 379/399; 379/377
[58] Field of Search ..................................... 379/395, 405, 379/98, 379, 376, 412, 345, 377, 399, 387, 398, 106, 375, 413

[56] References Cited

U.S. PATENT DOCUMENTS

| | | | |
|---|---|---|---|
| 4,192,978 | 3/1980 | Vincent | 379/405 |
| 4,417,099 | 11/1983 | Pierce | 379/98 |
| 4,529,845 | 7/1985 | Boeckmann | 379/376 |
| 4,540,854 | 9/1985 | Beirne | 379/345 |
| 4,567,331 | 1/1986 | Martin | 379/345 |
| 4,644,526 | 2/1987 | Wu | 370/30 |
| 4,741,031 | 4/1988 | Grandstaff | 379/375 |
| 4,757,528 | 7/1988 | Falater et al. | 379/412 |
| 4,864,605 | 9/1989 | Ramsey | 379/379 |
| 4,993,063 | 2/1991 | Kiko | 379/405 |
| 4,995,111 | 2/1991 | Tojo et al. | 379/405 |
| 5,097,503 | 3/1992 | Cotty | 379/399 |
| 5,136,630 | 8/1992 | Breneman et al. | 379/387 |
| 5,204,896 | 4/1993 | Oliver | 379/106 |
| 5,235,634 | 8/1993 | Oliver | 379/106 |
| 5,245,654 | 9/1993 | Wilkison et al. | 379/405 |
| 5,329,585 | 7/1994 | Susak et al. | 379/413 |
| 5,410,594 | 4/1995 | Maruyama | 379/413 |

Primary Examiner—Jeffery Hofsass
Assistant Examiner—Scott Wolinsky
Attorney, Agent, or Firm—Harris Zimmerman

[57] ABSTRACT

An isolation circuit for a telephone line interface includes a pair of capacitors that differentially couple analog transmit and receive channels in full duplex communication across an isolation barrier. Each transmit or receive signal is processed to generate respective paired complementary signals. A switching network is clock driven to differentially charge the paired capacitors in incremental fashion with the paired complementary signals. On the opposite side of the barrier, a clock driven switching network receives the differential charges on the paired capacitors, generating paired complementary signals that are processed to form an analog information signal. Clock signals, off-hook and ringing signals are transmitted in similar fashion. The invention can use two pairs of capacitors that differentially couple analog transmit and receive channels in a user device across an isolation barrier to a line pair for full duplex communication. The interface circuit includes first and second oppositely directed capacitor isolation circuits. The first is disposed between the transmit channel and a hybrid circuit; the second is connected between the receive channel and the hybrid. The transmit capacitor isolation circuit has an input located on the user device side of the isolation barrier and an output on the line side of the barrier and generates analog signals corresponding to analog signals at its input. A receive capacitor isolation circuit has an input located on the line side of the barrier and an output on the user side of the barrier and generates analog signals corresponding to analog signals at its input.

20 Claims, 10 Drawing Sheets

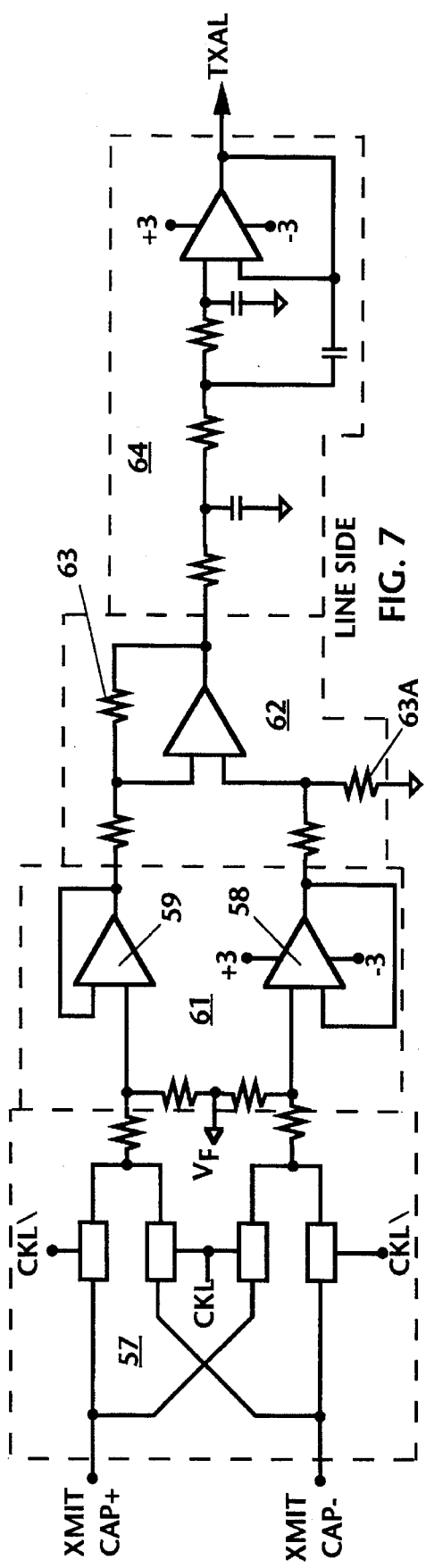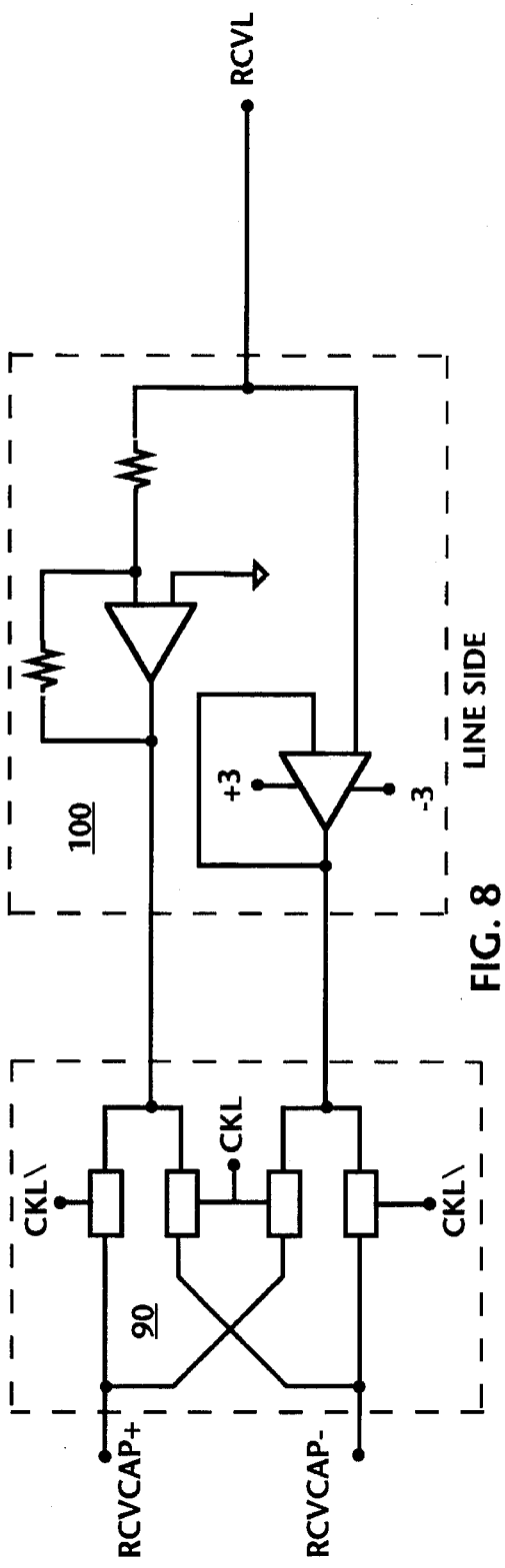
FIG. 7
FIG. 8

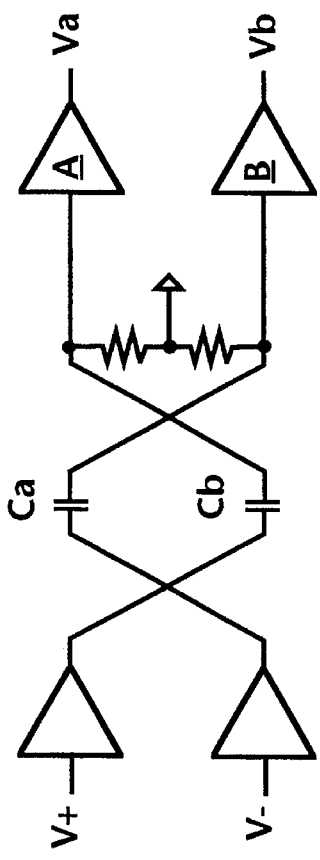
FIG. 14b
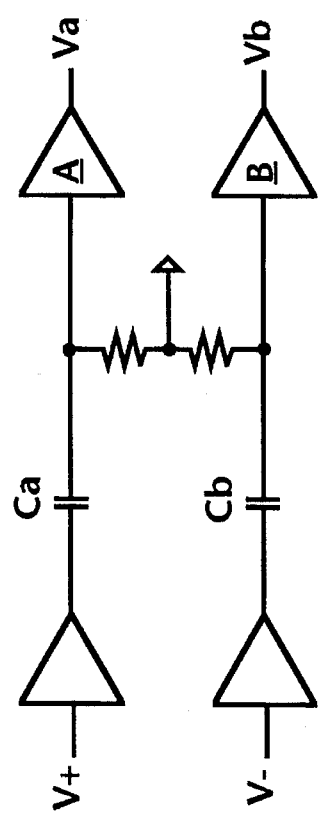
FIG. 14a
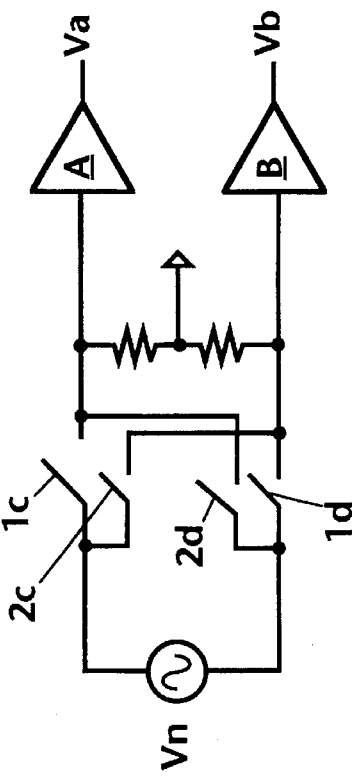
FIG. 15
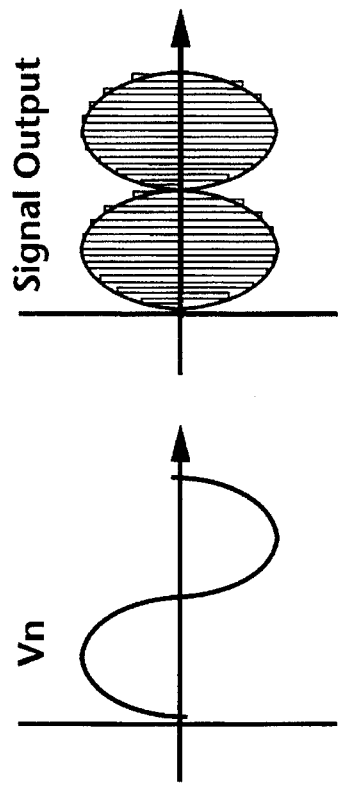
FIG. 16a
FIG. 16b

TELEPHONE ISOLATION DEVICE

BACKGROUND OF THE INVENTION

The present invention relates generally to electronic circuitry and more particularly to isolation circuitry such as used in telephone line interface equipment.

Isolation of end user telephone equipment from the telephone network is required by the U.S. Federal Communications Commission and other counterpart regulatory agencies in other countries. The primary purpose of this regulation is to protect the network from faulty end user devices and from accidental connections to power lines and the like.

The specific regulations for such isolation change from country to country. The U.S. requires 1000 VRMS isolation while other countries may require 3500 to 4000 volt isolation. These regulations are usually dependent on power line mains voltage and internal country safety requirements. Common wisdom among those skilled in the field of Direct Access Arrangements or DAA's has shown other techniques than the application of isolation transformers between the end user equipment and the network. There has been some recent recognition that certain paths can be isolated using other techniques. For example, U.S. Pat. No. 4,864,605 to Ramsey et al shows the use of a coupling transformer in the main signal path and optical isolators in the ring detect and off-hook driving circuitry. In a similar way, U.S. Pat. No. 4,417,099 to Pierce discloses the use of optoisolators in the digital portion of the data paths of a line-powered modem. Moreover, U.S. Pat. No. 4,757,528 to Falater et al discloses an electro-thermal isolator coupler in conjunction with an RF capacitive coupling mechanism. This system claims to provide a DAA device, but requires a substrate having a subscriber portion and a line portion electrically isolated from each other.

Moreover, U.S. Pat. No. 5,245,654 to Wilkison et al discloses an optical isolation coupler circuit characterized by wide band width, low noise, and high linearity. This circuit has proven expensive due to the tightly coupled optical devices required to provide the necessary feedback for linearity.

The present invention eliminates the requirement for thermal, resistive, and optical isolation. The thermal and optical isolation requirements are complex and expensive to produce. The use of an integrated circuit to thermally transfer low frequency signals can be supplanted by other means that are more cost effective to produce. The capacitive approach lends itself to a more integrated design using less external components.

SUMMARY OF THE INVENTION

The present invention provides an isolation circuit that is devoid of a coupling transformer, optical isolator elements, and high value resistors, and yet is practical for use as a telephone line interface.

In one aspect, the present invention uses a pair of capacitors that differentially couple analog transmit and receive channels in full duplex communication across an isolation barrier. The capacitors are connected across the isolation barrier, and each transmit or receive signal is processed to generate respective paired complementary signals. A switching network on one side of the barrier is clock driven to differentially charge the paired capacitors in incremental fashion with the paired complementary signals. On the opposite side of the barrier, a clock driven switching network receives the differential charges on the paired capacitors, generating paired complementary signals that are processed to form a single analog information signal. Clock signals and off-hook and ringing signals are also transmitted across the barrier in similar fashion.

In another aspect, the invention can be configured to engage two pairs of capacitors that differentially couple analog transmit and receive channels in a user device across an isolation barrier to a telephone line pair for full duplex communication on the line side. The interface circuit, which also includes a hybrid circuit, includes first and second oppositely directed capacitor isolation circuits. The first is disposed between the transmit channel and the hybrid; the second is connected between the receive channel and the hybrid.

More specifically, a transmit capacitor isolation circuit has an input located on the user device side of the isolation barrier and an output on the line side of the barrier and generates analog signals at its output corresponding to analog signals at its input. A receive capacitor isolation circuit has in input located on the line side of the barrier and an output on the user side of the barrier and generates analog signals at its output corresponding to analog signals at its input.

BRIEF DESCRIPTION OF THE DRAWING

FIG. 7 is a detailed schematic diagram of the transmit circuit on the line interface of the telephone interface of the invention.

FIG. 8 is a detailed schematic diagram of the receive circuit on the line interface of the telephone interface of the invention.

FIGS. 14A and 14B are simplified schematic diagrams depicting the operation of the differential capacitor charging and detecting circuits of the invention.

FIG. 15 is a simplified schematic diagram depicting the common mode noise characteristic of the differential capacitor charging and detecting circuits of the invention.

FIGS. 16A and 16B are graphic depictions of the common mode noise signal of the circuit depicted in FIG. 15.

DESCRIPTION OF THE PREFERRED EMBODIMENT

Figure 1:
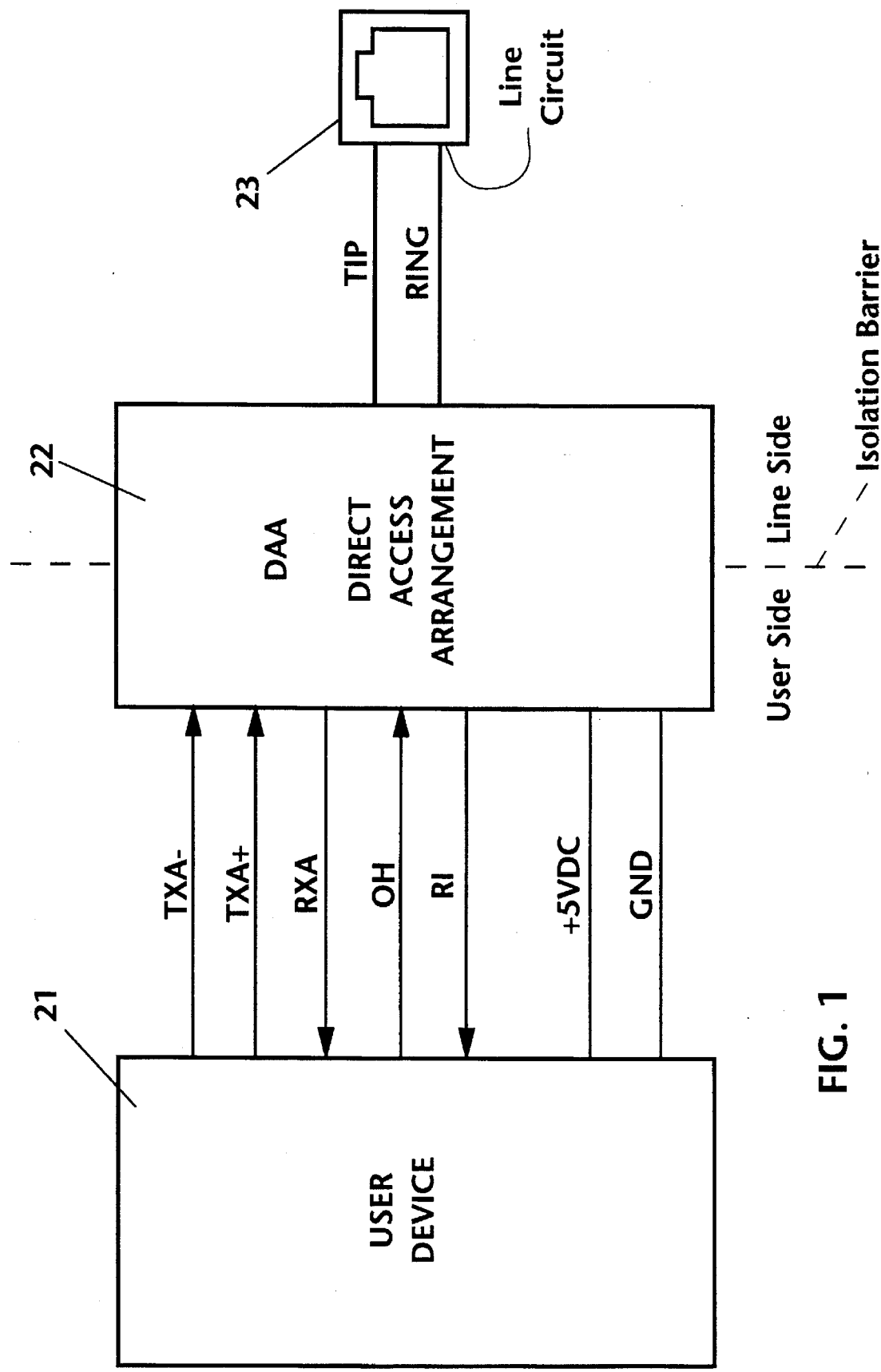
FIG. 1 is a functional block diagram of a telephone interface showing the interconnection of the present invention between a user device and a telephone network.

The present invention provides a telephone isolation circuit 22, shown in FIG. 1, that is used to connect a user device 21 to a telephone line circuit 23, symbolized as a RJ-11 connector. The telephone isolation circuit 22 is referred to as a Direct Access Arrangement (alternatively, Data Access Arrangement), or DAA, and is devoid of coupling transformers, optical isolator elements, and high value resistors, while providing optimal communication paths and isolation between the user device 21 and the line circuit 23.

Figure 2:
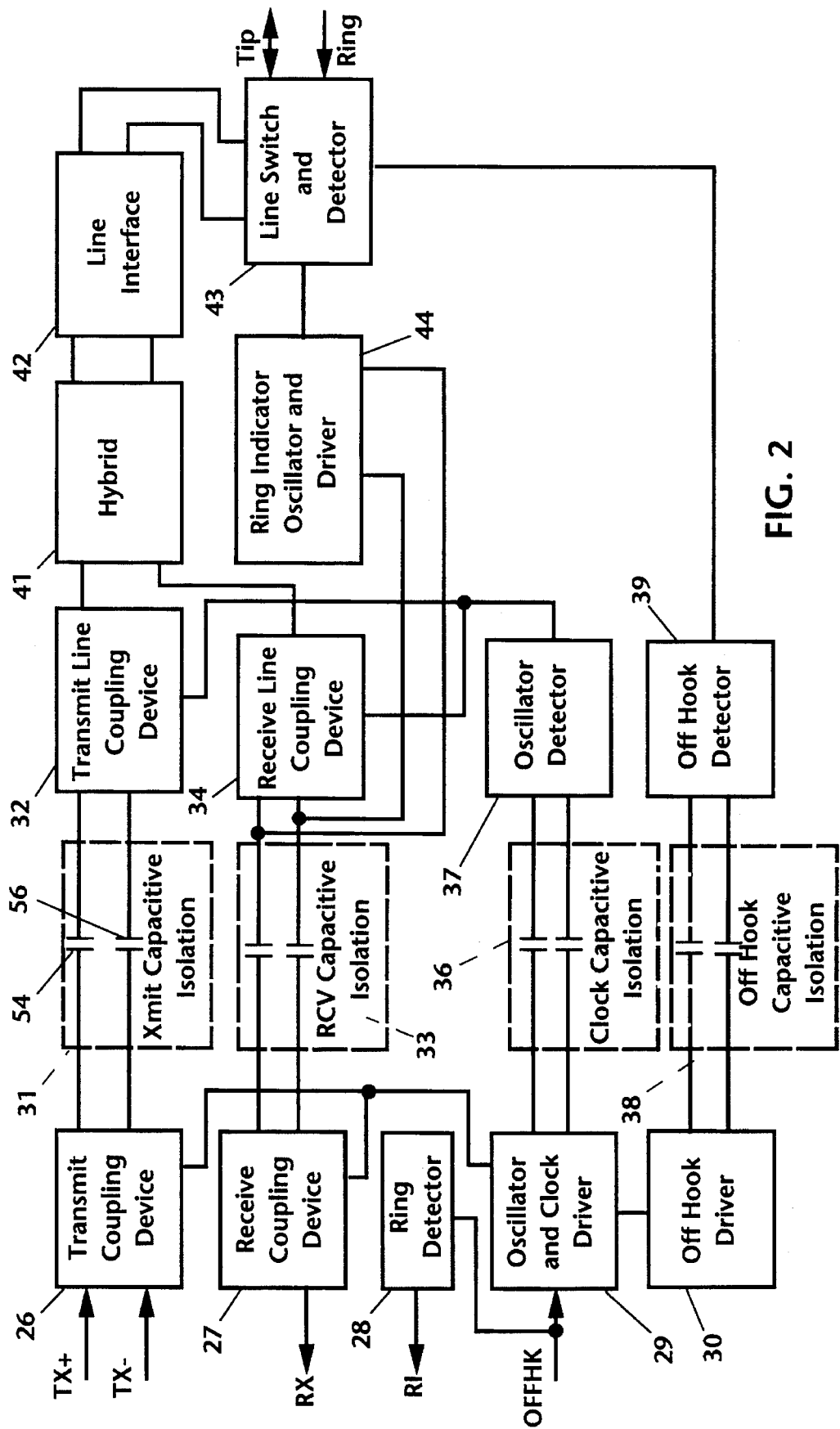
FIG. 2 is a functional block diagram of an embodiment of the telephone interface of the invention featuring independent transmit and receive circuits.

With regard to FIG. 2, the DAA 22 of the invention generally includes a user side having a transmit coupling device 26 which accepts communication signals from the user device, a receive coupling device 27 which delivers communication signals to the user device, a ring detector 28, an oscillator and clock driver 29, and an off-hook driver 30. A salient feature of the DAA 22 is the use of capacitive coupling to electrically isolate the user device from the line circuit. Thus, a transmit capacitive isolation circuit 31 connects the transmit coupling device 26 to a transmit line coupling device 32, and a receive capacitive isolation device 33 connects the receive coupling device 27 to a receive line coupling device 34. Likewise, a clock capacitive isolation device 36 connects the oscillator and clock driver 29 to an oscillator detector 37, and an off-hook capacitive isolation device connects the off-hook driver 30 to an off-hook detector 39. The isolation devices 31, 33, 36, and 38 transmit their respective signals across the user-line interface to permit standard telephone operations, while providing high level electrical isolation between the user device and telephone line.

The transmit line coupling device 32 and the receive line coupling device 34 are connected to a hybrid circuit 41, which in turn is connected through a line interface circuit 42 and a relay and detector circuit 43 to the telephone line. The oscillator detector 37 is connected to the receive line coupling device and to the transmit circuit 32. The off-hook detector 39 is connected directly to the line switch and detector circuit 43. A ring indicator oscillator and driver 44 is connected between the receive capacitive isolation device 33 and the line switch and detector circuit 43. Generally speaking, the devices and circuits 32, 34, 37, 39, and 41-44 are considered to be on the telephone line side of the DAA 22.

Figure 3:
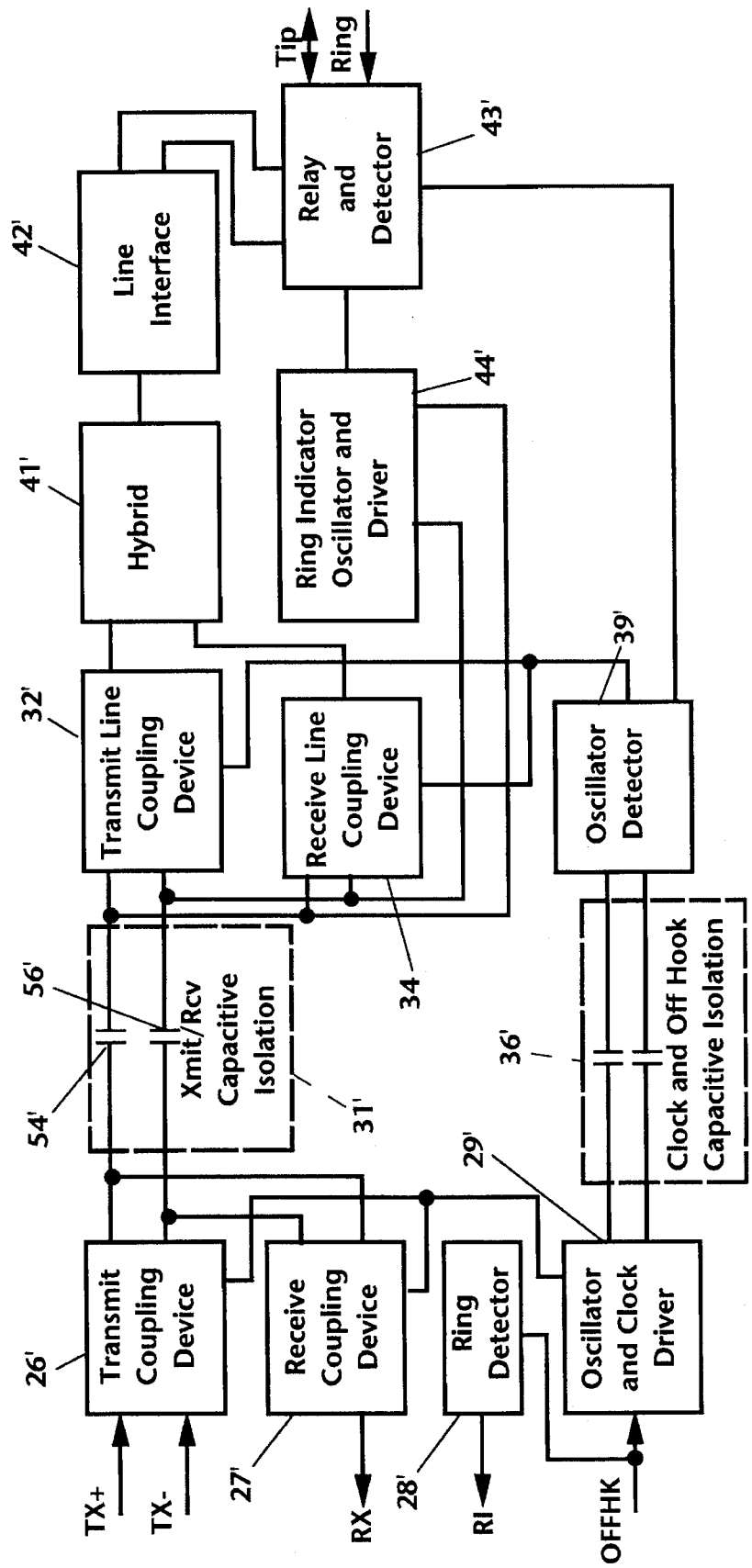
FIG. 3 is a functional block diagram of another embodiment of the telephone interface of the invention featuring a combined full duplex transmit and receive circuit.

The circuit configuration may be simplified, as shown in FIG. 3, in which similar components are labeled with the same reference numeral and a prime (') designation. In the embodiment of FIG. 3, the clock driver circuit and off-hook driver device are connected through the same clock capacitive isolation device 36', and the transmit and receive functions are conducted through a single capacitive isolation device 31' using a time division multiplexing technique. This simplification permits the elimination of components 30, 33, 38, and 39, with the accompanying savings in parts and labor cost.

Figures 4, 5:
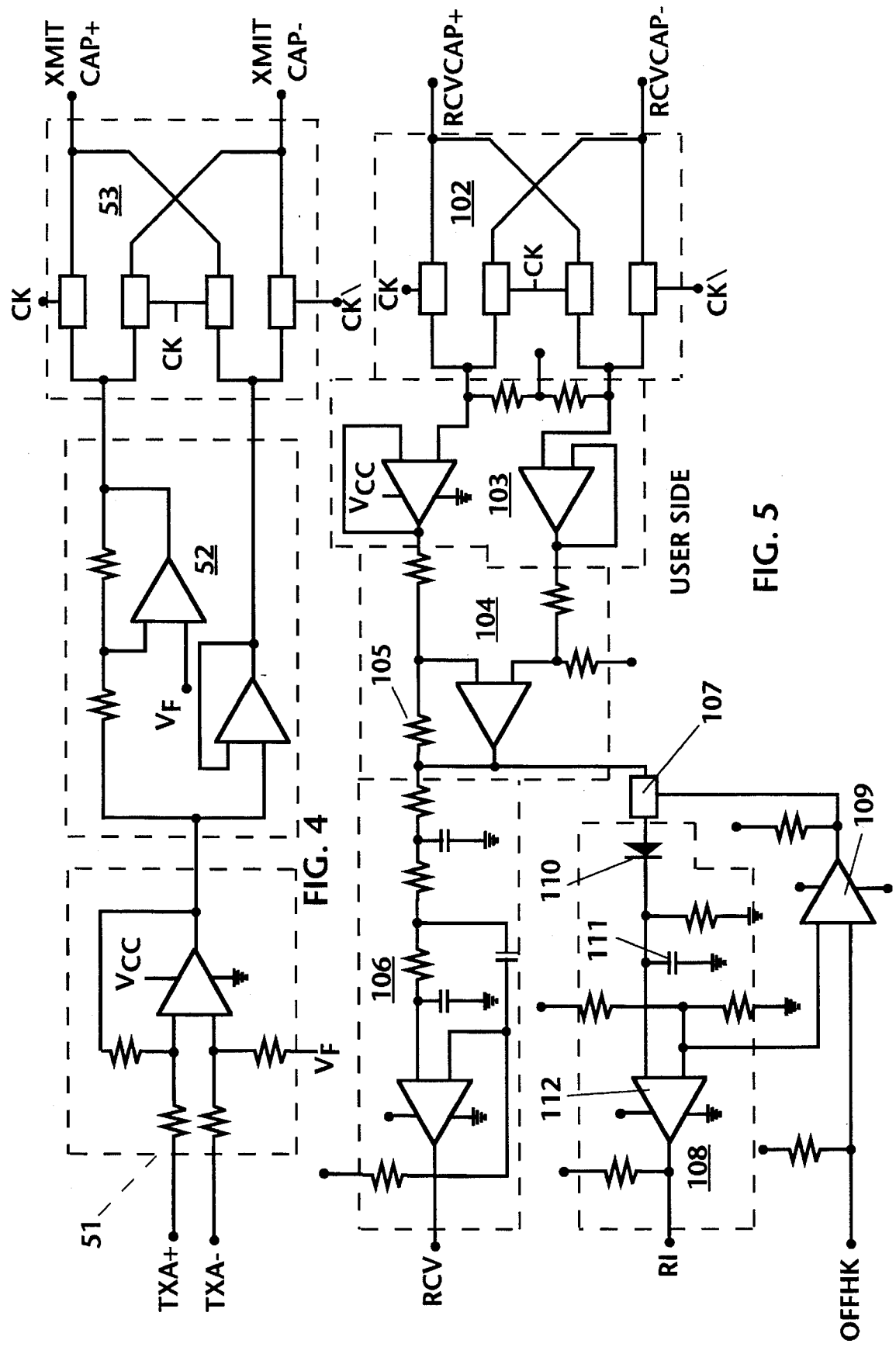
FIG. 4 is a detailed schematic diagram of the transmit circuit on the user side of the telephone interface of the present invention.
FIG. 5 is a detailed schematic diagram of the receive circuit and ring signal interpreter circuit on the user side of the telephone interface of the invention.

With regard to FIG. 4, the transmit coupling device 26 includes an input buffer circuit 51. The TXA+ and TXA− signals are received differentially by the buffer 51 from the user device, and the buffer 51 translates the incoming signals into a single ended signal to be used by the differential translator signal driver 52. (The TXA− signal may be grounded for a single ended input device without affecting the operation of the circuitry as described herein.) The differential signal from driver 52 is fed to a transmit switch network 53, which charges the capacitors 54 and 56 of the transmit capacitive isolation device 31, as explained below. On the line side of the isolation interface, the transmit line coupling device 32 includes a transmitter signal recovery switch network 57, as shown in FIG. 7. The network 57 is composed of a quad switch circuit configured similarly to the capacitor input network 53 on the user side, and synchronized therewith by a common clock signal. The two networks 53 and 57 operate cooperatively to switch an information signal across the interface barrier in a reiterative process. The following explanation pertains not only to networks 53 and 57, but to all the differential network circuits described herein for transmitting signals across the isolation barrier.

With regard to FIG. 14, the two differential switching networks can assume two different configurations, depending upon whether the clock signal is high or low. When the clock signal is high, as shown in FIG. 14A, the positive differential signal V+ is conducted to capacitor Ca, charging Ca and causing the signal to be conducted directly to op amp A, resulting in signal Va. Likewise, differential signal V− passes through capacitor Cb to op amp B, resulting in signal Vb. When the clock signal shifts low, the quad switches flip on both sides of the capacitors, resulting in the circuit arrangement of FIG. 14B. Signal V+ charges capacitor Cb, and signal V− charges capacitor Ca. The signal from Cb goes to op amp A, and the signal from capacitor CA goes to op amp B. Thus, although the charges on capacitors Ca and Cb have been reversed, the signal V+ is conducted to op amp A and the signal V− is conducted to op amp B, so that Va remains a function of V+, and Vb remains a function of V−. This process reiterates in synchronism with the clock signal, transmitting the signals across the isolation barrier.

Using this technique of switching the capacitor polarity in an opposite way the telephone voice band signal frequencies are able to pass through a small value capacitor and still transfer 80% of the signal value at Va and Vb.

This signal transmission technique significantly reduces common mode noise. The equivalent circuit for common mode noise, Vn, is depicted in FIG. 15, Assuming that the capacitor ratio $C_a/C_b$ is less than the resistance ratio of the voltage divider, then in the high clock state, Va=+½ Vn and Vb=−½ Vn, and in the low clock state Va=−½ Vn and Vb=+½ Vn. Given a Vn signal input as depicted in FIG. 16A, the corresponding signal output is depicted in FIG. 16B. The common mode noise has been shifted from the voice band into the clock frequency by the signal transmission technique and eliminated by a low pass filter having an upper corner cutoff of 10 KHZ to 15 Khz.

Returning to FIG. 7, the two op amps 58 and 59 serve as a buffer 61 to recover the differential signals and restore them to a proper level. The buffered differential signals are fed to an op amp converter circuit 62 that restores the differential signals to a single-ended signal. The value of resistors 63 and 63A may be selectively varied to alter the gain of the transmit path, in accordance with the requirements of various modem integrated circuits. The single-ended signal is fed through an anti-alias low pass filter 64 which has an upper corner frequency of 15 KHz to remove the residual effects and noise generated by the switching network 57, as well as common mode noise. The resulting output is the TXAL signal, a smooth, filtered, gain-controlled analog signal equivalent to the user generated information signal.

Figure 9:
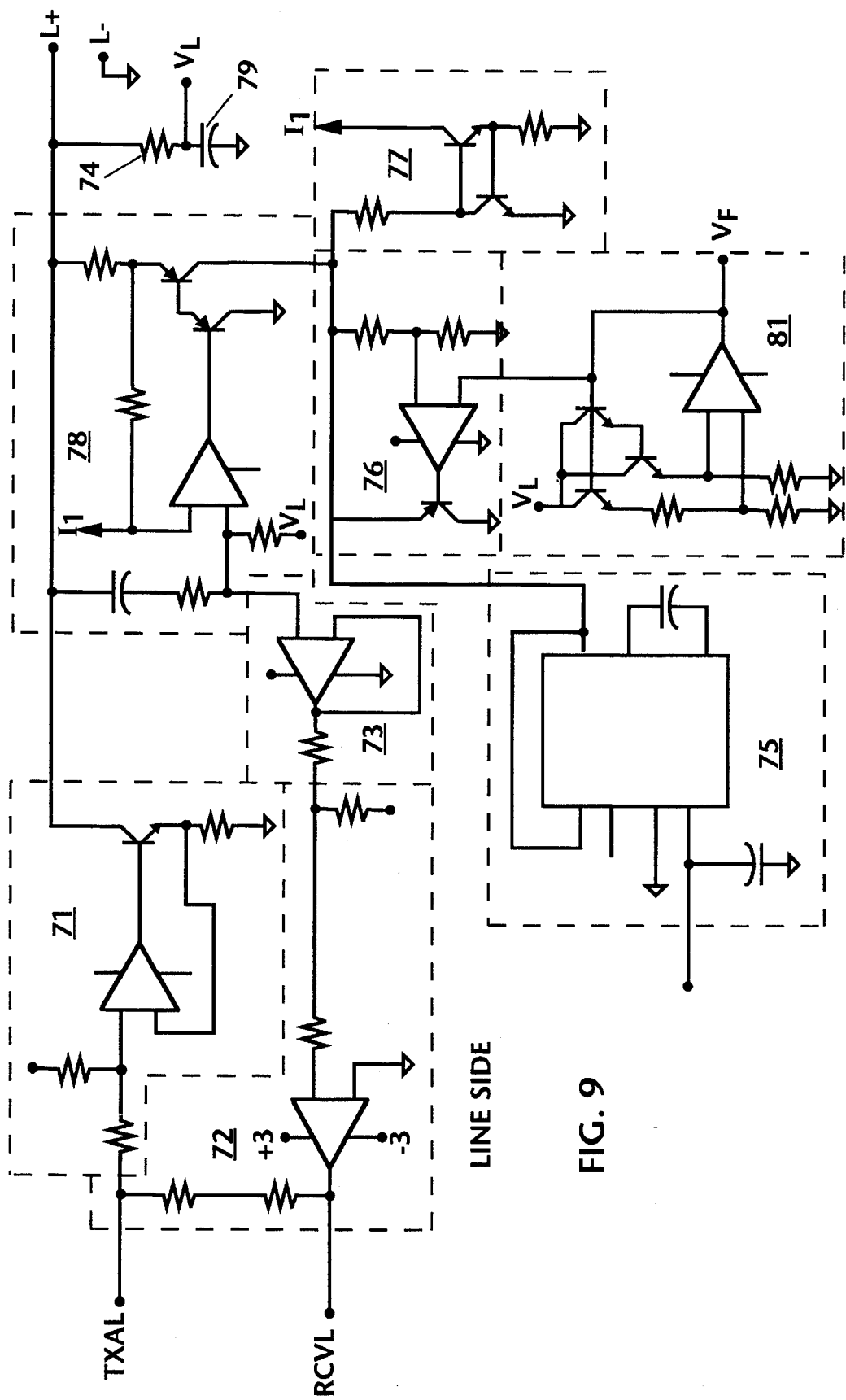
FIG. 9 is a detailed schematic diagram of the line interface and voltage generator circuits on the line side of the interface of the invention.

With regard to FIG. 9, the TXAL signal is connected to drive a low distortion transmitter signal current driver 71, which in turn is fed to the hybrid circuit 41 or 41' of FIGS. 2 and 3. The hybrid circuit consists of an op amp connected to function as a receive path amplifier 73 that produces a voltage equal to the superposition of the outgoing and incoming currents on the line side, and a return signal cancellation circuit 72 that removes a selected proportion of the outgoing signal. For voice communication, a small amount of the outgoing signal is permitted to pass through the receive channel, creating a side tone effect. The speaker thus hears a small portion of his/her own voice, giving presence to the connection. For modem applications and the like, circuit 72 provides almost complete elimination of the outgoing signal to the user device. The degree of side tone removal is determined by the accuracy of the impedance match between the telephone line and resistor 74.

Resistor 74 and capacitor 79 are connected in series between L+ and L− (common), and the output $V_L$ to power super stable voltage reference 81. Resistor 74 generates a voltage proportional to the current flowing in the line, and capacitor 79 bypasses the AC signal on the line. Circuit 76 comprises a positive voltage regulator producing a voltage $V_1$ (+3V), which also provides a stable driving voltage for a current reference generator 77, which produces a current $I_1$. The stable current $I_1$ is fed to a DC resistance control circuit 78, which sets the DC resistance slope for the DAA in accordance with the regulations formulated in the EIA/TIA and Bell specifications. Circuit 75 produces a steady −3VDC from the $V_1$ input to power many of the op amp circuits on the line side described herein. This unique control circuitry provides AC termination, allow drawing current for the line side apparatus without interfering with the proper DC termination, provides a low distortion transmit signal generation mechanism, and converts the current from the line into a dual voltage supply.

The circuit 72 also produces the receive line signal RCVL, which is fed through a differential signal processor 100 (FIG. 8), to convert the single-ended RCVL signal to complementary differential signals. These signals are fed to a clocked switch network 90 which is driven by the complementary clock signals CKL and CKL\ to differentially charge the isolation capacitors of circuit 33. The operation of this network are described with reference to FIG. 14 in the preceding description.

Figure 12:
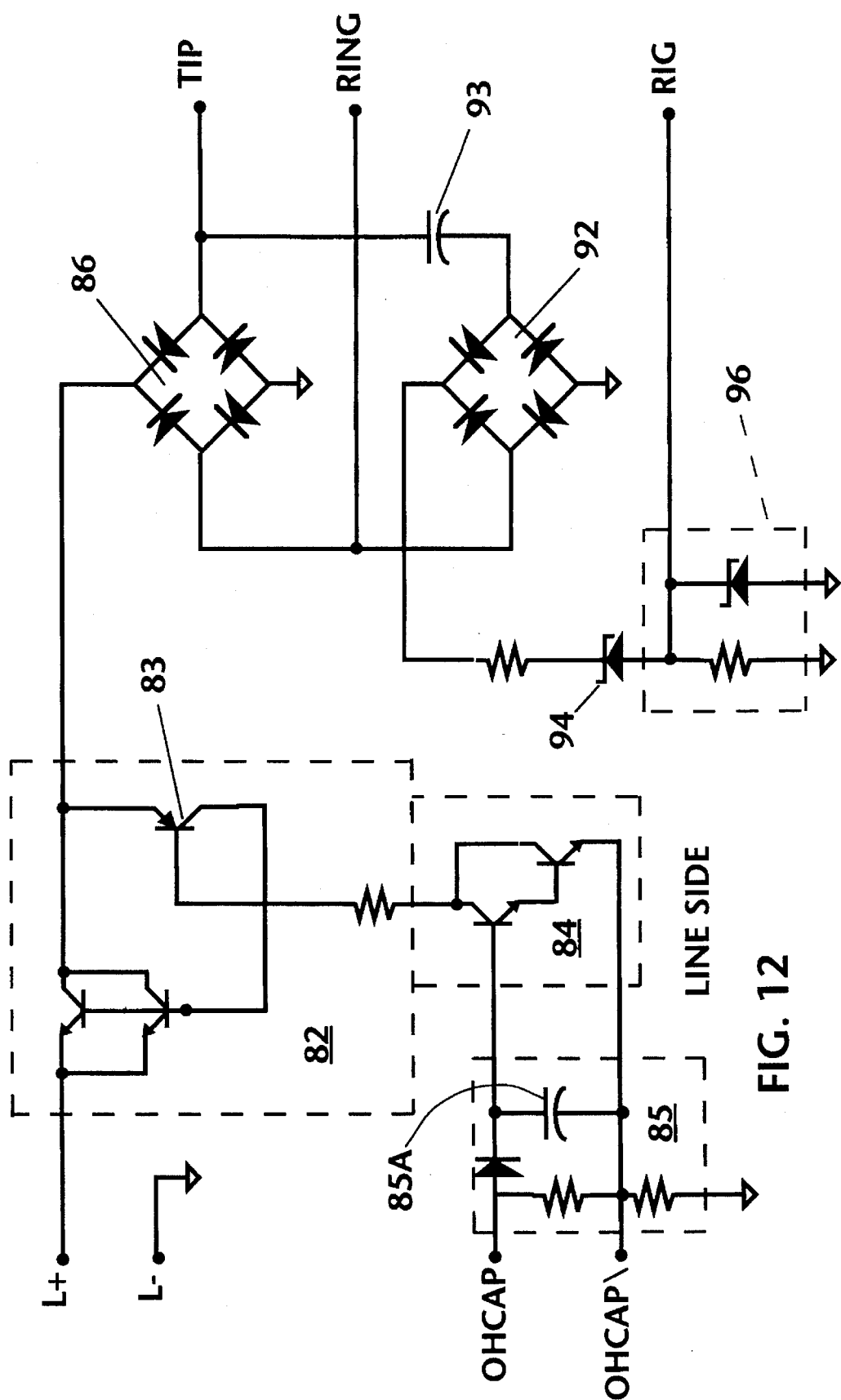
FIG. 12 is a detailed schematic diagram of the ring detection and line coupler circuits on the line side of the interface of the invention.

With regard to FIG. 12, the line interface 42 and the line switch and detector circuit 43 (of FIG. 3) includes a solid state off-hook line switch 82 comprised of a pair of parallel transistors to open and close the current path from the telephone line to the L+ output. An off-hook switch driver 84 is controlled by an off-hook clock receiver and charge pump circuit 85, which is connected to the line sides of off-hook isolation capacitors in device 36 of FIG. 2. A secondary transistor 83 is used in conjunction with the off-hook switch driver 84 to insure only leakage current flows until the energy across capacitor 85A is sufficient to forward bias the darlington pair of the off-hook switch driver 84. A bridge rectifier 86, connected between the TIP connection and the off-hook line switch, is formed of Schottky diodes or the like, to regulate plus and minus polarity from the TIP signal.

Figures 6, 13:
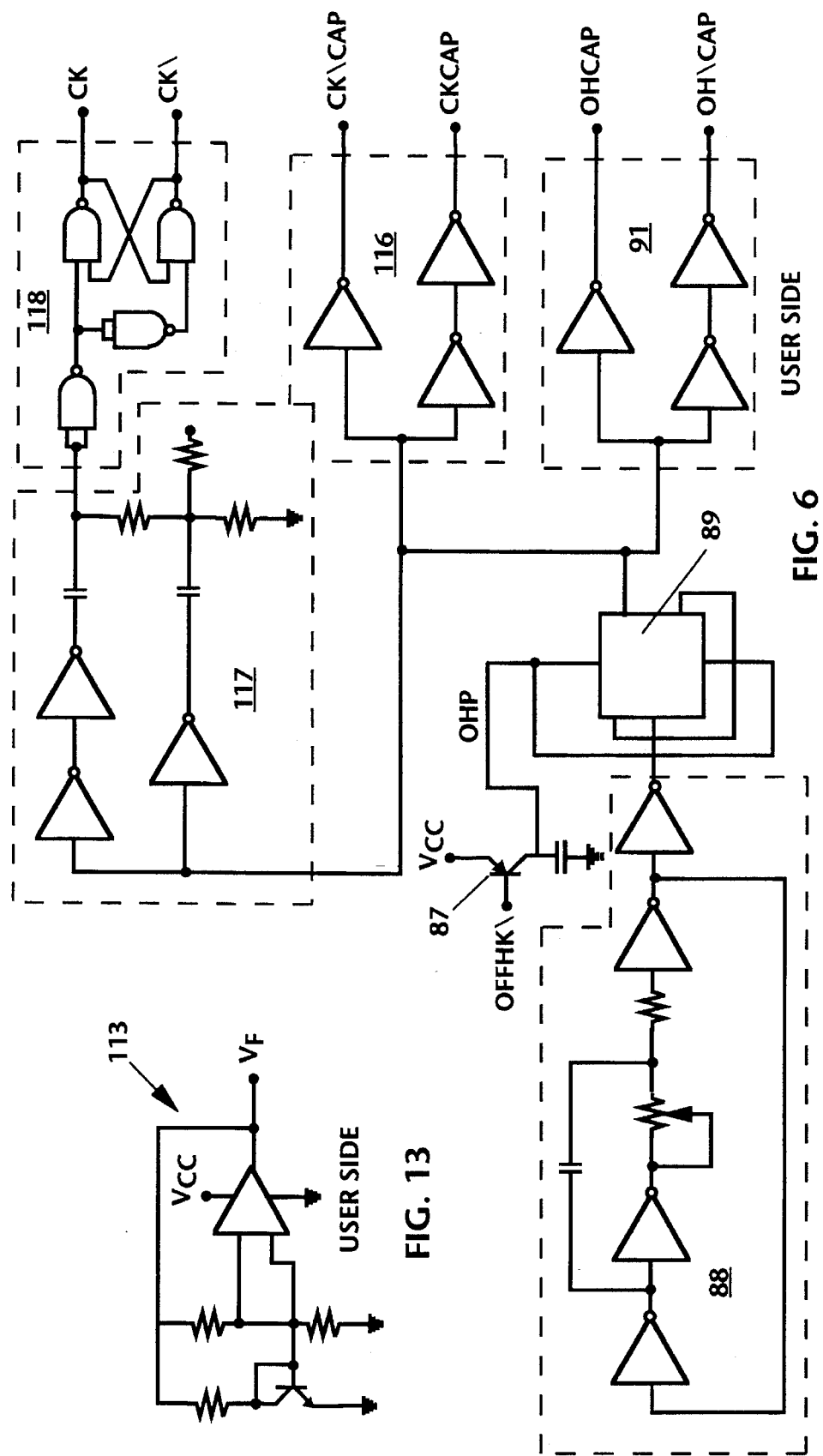
FIG. 6 is a detailed schematic diagram of the switching clock generator, phase control, and off-hook control circuits on the user side of the telephone interface.
FIG. 13 is a detailed schematic diagram of the reference voltage generator circuit on the user side of the interface of the invention.

With regard to FIG. 6, when the user device signals the DAA to go off-hook by placing the OFFHK\ line in a low state, transistor 87 is forward biased and turns conductive. Square wave generator 88 operates continuously to produce a constant frequency (e.g., 600 KHz), which is fed to divide-by-two counter 89 to achieve a 50% duty signal. Activation of transistor 87 permits the counter 89 to operate, passing the square wave (at 300 KHz) to a differential off-hook clock driver 91. The clock driver 91 supplies the signals OHCAP and OH\CAP to the user sides of the capacitors in circuit 38 (FIG. 2).

Figure 11:
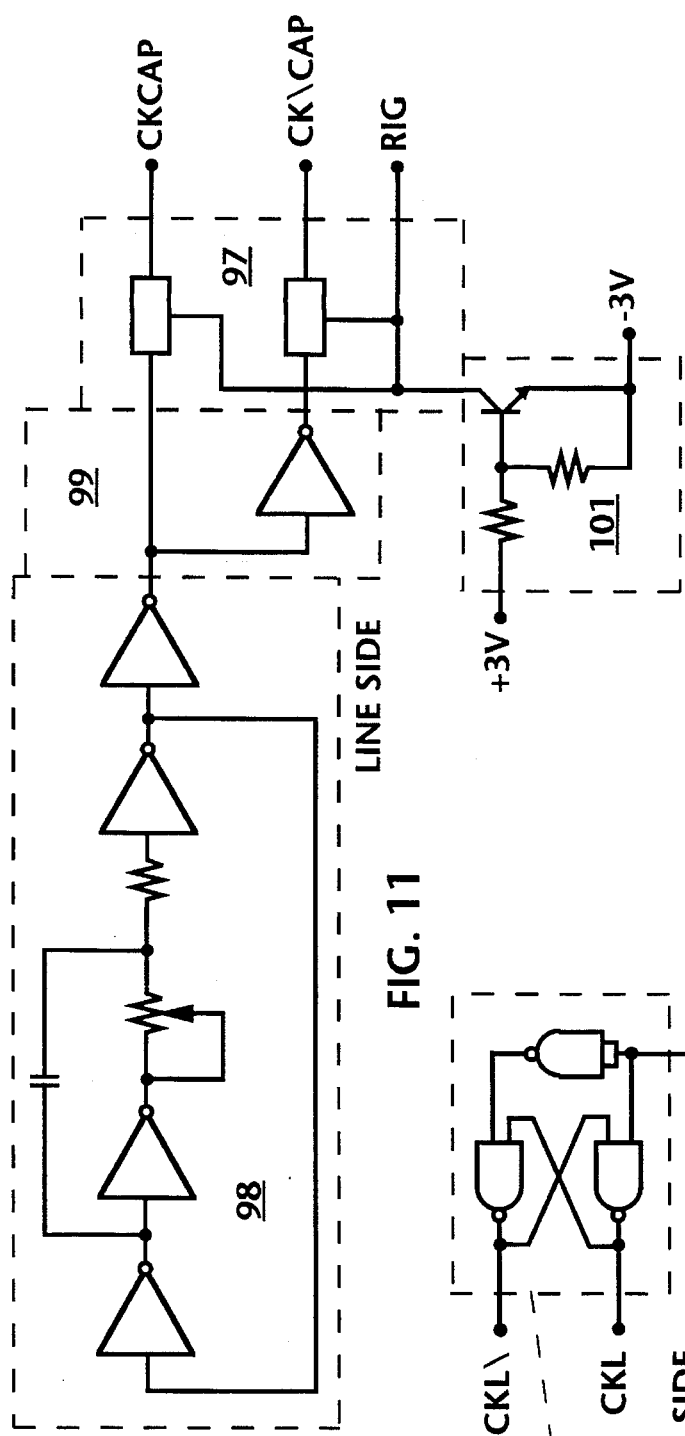
FIG. 11 is a detailed schematic diagram of the ring interface circuit on the line side of the interface of the invention.

Returning to FIG. 12, bridge rectifier 92 is connected to ring signal AC coupling capacitor 93 to develop a DC level greater than the threshold of zener diode 94. When ring signals from the telephone line reach peaks above approximately 30 volts peak they raise the DC level across the parallel resistor-zener network 96. This voltage attains a level no greater than approximately 5.1 volts, and comprises the RIG signal that is used to power the switching network 97 and ring oscillator of FIG. 11. Switching network 97 passes the ring oscillator signal to the line side of the receive isolation capacitors of device 33 (FIG. 2). Ring oscillator 98 (FIG. 11) is set to operate at approximately 300 KHz, and feeds the differential driver circuit 99. A lockout circuit 101 prevents the ring signal information from being generated unless the DAA is on-hook. When the DAA is off-hook the transistor of circuit 101 is turned on, preventing the RIG signal from actuating the switches of circuit 97.

On the user side of device 33, differential switched network 102 (FIG. 5) receives signals from the isolation capacitors of device 33 and is synchronized with them by the clock signals described previously. The received signal is recovered in differential analog form and fed to an input signal buffer 103. The buffered signal is fed to a converter circuit 104 which transforms the differential analog signal to a single-ended signal. The output of the op amp in circuit 104 sets the gain of the receive side. The value of resistor 105 can be adjusted to adapt to different modem chips.

The signal output of the differential to single ended converter 104 provides input for two different applications. One is the receiver section that is active when the DAA is off-hook. The signal from converter 104 is fed to an anti-alias low pass filter circuit 106. The filter corner frequency is approximately 15 KHz to remove the switch noise and high frequency RF noise on the telephone line. The op amp of filter circuit 106 provides a buffered output signal RCV at the user interface point connection. The RCV signal comprises the analog received signal for all user devices connected to the interface. The output of buffer circuit 104 is also fed through switch 107 to a ring indicator circuit 108. The received analog signal is representative of the ringing signal. If the DAA is on-hook and the OFFHK\ signal is absent, op amp 109 will turn on switch 107 and feed the received analog signal to a ring indicator circuit 108. The signal is rectified by diode 110 and used to charge capacitor 111. The capacitor charge is compared by op amp 112 to a fixed voltage reference, and a ring signal output RI\ is generated when the charge exceeds the reference. The output RI\ is provided to an output connection point of the user interface.

One circuit necessary for the functioning of various portions of the user side of the DAA is a reference voltage generator 113, depicted in FIG. 13. The circuit 113 operates on the standard $V_{CC}$ provided on the user side, and generates a 2.5 VDC stable output for the op amps on the user side. Returning to FIG. 6, the 300 KHz square wave output of the counter 89 is also fed to a differential clock driver circuit 116, which generates the signals CK\NCAP and CKCAP used to transfer energy across the isolation capacitors. The output of counter 89 is also fed to a phase delay circuit 117, which is designed to match the delays of the external isolation capacitor elements of circuits 31, 33, 36, and 38. The phase delay circuit 117 generates a correctly timed clock signal for the two phase clock circuit 118, which in turn supplies the clock signal pair CK and CK\ to all the user side coupling devices.

Figure 10:
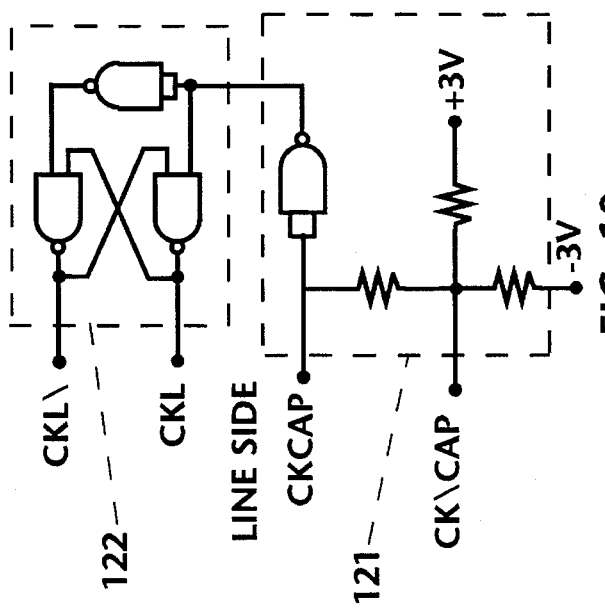
FIG. 10 is a detailed schematic diagram of the switching clock circuit on the line side of the interface of the invention.

Another circuit necessary for various portions of the line side of the DAA is the clock system depicted in FIG. 10. Clock signals transmitted through the capacitors of circuit 36 are received by a buffer circuit 121, and processed by a squaring circuit 122. The output of circuit 122 is the clock signals CKL\ and CKL which are used to drive the switching networks of FIG. 7 on the telephone line side. Thus the clock signals originating on the user side are transmitted across the interface to synchronize the signal decoding on the line side.

The circuits described herein may be formed of devices that are discrete components, or may be part of an integrated circuit formed using conventional ASIC techniques.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. An isolation circuit for connecting a user device to a communication line pair for full duplex communication on the line pair while providing an electrical isolation barrier between the user side and the line side of the isolation circuit, comprising:

a pair of capacitors connected across said electrical isolation barrier, each of said capacitors having like first ends connected to said one side of said isolation circuit and like second ends connected to the other side of said isolation circuit; and, means for transmitting an information signal across said capacitors from said one side to said other side, including means for differentially charging said like first ends of said pair of capacitors with said information signal, means for receiving said differential charge on said like second ends of said pair of capacitors, and means for converting said differential charge on said second end to a restored information signal.

2. The isolation circuit of claim 1, wherein said means for differentially charging includes differential translator circuit means for receiving said information signal and generating paired complementary differential signals corresponding to said information signal.

3. A method for transmitting an information signal across an electrical isolation barrier between a telephone line pair and a user device, including the steps of:

connecting a pair of capacitors across said isolation barrier;

differentially charging said pair of capacitors with said information signal on one side of said isolation barrier;

detecting the differential charge on said pair of capacitors on the other side of said isolation barrier; and, converting the detected differential charges on said pair of capacitors into a received signal corresponding to said information signal.

4. The method for transmitting an information signal across an electrical isolation barrier of claim 3, further including the step of converting said information signal to paired complementary differential signals to charge said capacitors.

5. An isolation circuit for connecting a user device to a communication line pair for full duplex communication on the line pair while providing an electrical isolation barrier between the user side and the line side of the isolation circuit, including:

a pair of capacitors connected across said electrical isolation barrier; and, switching means for synchronously switching an information signal alternately to each of said pair of capacitors to differentially charge said capacitors and transmit said information signal across said isolation barrier, whereby common mode noise is eliminated by said switching means.

6. An isolation circuit for connecting a user device to a communication line pair for full duplex communication on the line pair while providing an electrical isolation barrier between the user side and the line side of the isolation circuit, comprising:

a first pair of capacitors connected across said electrical isolation barrier, each of said capacitors having like first ends connected to one side of said isolation circuit and like second ends connected to the other side of said isolation circuit;

means for transmitting an information signal across said capacitors from said one side to said other side, including means for differentially charging said like first ends of said pair of capacitors with said information signal, means for receiving said differential charge on said like second ends of said pair of capacitors, and means for converting said differential charge on said second end to a restored information signal;

said means for differentially charging including differential translator circuit means for receiving said information signal and generating paired complementary differential signals corresponding to said information signal;

said means for differentially charging further including switched transmit network means for incrementally and alternately switching said paired complementary differential signals to said first ends of said pair of capacitors.

7. The isolation circuit of claim 6, further including first clock signal means for generating a clock signal to drive said switched transmit network means to operate reiteratively and cyclically.

8. The isolation circuit of claim 7, wherein said means for receiving said differential charge includes switched receive network means for incrementally and alternately switching charge levels from said second ends of said capacitors to form paired complementary received differential signals.

9. The isolation circuit of claim 8, wherein said means for receiving said differential charge includes differential decoder circuit means for receiving said paired complementary received differential signals and generating a corresponding received information signal.

10. The isolation circuit of claim 8, further including second clock signal means for generating a clock signal to drive said switched receive network means to operate reiteratively and cyclically.

11. The isolation circuit of claim 10, further including means for synchronizing said first and second clock signal means.

12. The isolation circuit of claim 11, wherein said means for synchronizing includes means for transmitting clock signals across said isolation barrier to link said first and second clock signal means.

13. The isolation circuit of claim 12, wherein said means for transmitting clock signals includes a second pair of capacitors connected across said electrical isolation barrier, each of said second capacitors having like first ends connected to said one side of said isolation circuit and like second ends connected to the other side of said isolation circuit.

14. The isolation circuit of claim 13, further including phase shifting means connected between said first and second clock signal means to compensate for phase shift caused by said second pair of capacitors.

15. The isolation circuit of claim 9, further including voltage recovery means for receiving current provided by said line pair and generating an operating voltage for driving circuitry on said line side of said isolation barrier.

16. The isolation circuit of claim 15, wherein said voltage recovery means includes circuit means connected to said current provided by said line pair and having high AC impedance and adjustable DC resistance.

17. The isolation circuit of claim 15, further including stable voltage reference means for receiving said operating voltage and generating a highly stable voltage reference for circuitry on said line side of said isolation barrier.

18. An isolation circuit for connecting a user device to a communication line pair for full duplex communication on the line pair while providing an electrical isolation barrier between the user side and the line side of the isolation circuit, comprising:

a first pair of capacitors connected across said electrical isolation barrier, each of said capacitors having like first ends connected to one side of said isolation circuit and like second ends connected to the other side of said isolation circuit;

means for transmitting an information signal across said capacitors from said one side to said other side, including means for differentially charging said like first ends of said pair of capacitors with said information signal, means for receiving said differential charge on said like second ends of said pair of capacitors, and means for converting said differential charge on said second end to a restored information signal;

further including another pair of capacitors connected across said electrical isolation barrier, and means for transmitting an off-hook signal from said user side to said line side of said isolation barrier.

19. The isolation circuit of claim 18, further including means for transmitting a ringing signal across said another pair of capacitors from said line side to said user side of said isolation barrier.

20. A method for transmitting an information signal across an electrical isolation barrier between a telephone line pair and a user device, including the steps of:

connecting a pair of capacitors across said isolation barrier;

differentially charging said pair of capacitors with said information signal on one side of said isolation barrier;

detecting the differential charge on said pair of capacitors on the other side of said isolation barrier;

converting the detected differential charges on said pair of capacitors into a received signal corresponding to said information signal;

converting said information signal to paired complementary differential signals to charge said capacitors; and incrementally and reversibly charging said pair of capacitors in reiterative fashion in synchronism with a constant clock signal.

* * * * *